May 25, 1926.
J. KELLER
1,586,155
MACHINE FOR GAUGING ROUNDNESS AND TAPER OF ROLLS
Filed August 15, 1923     10 Sheets-Sheet 5
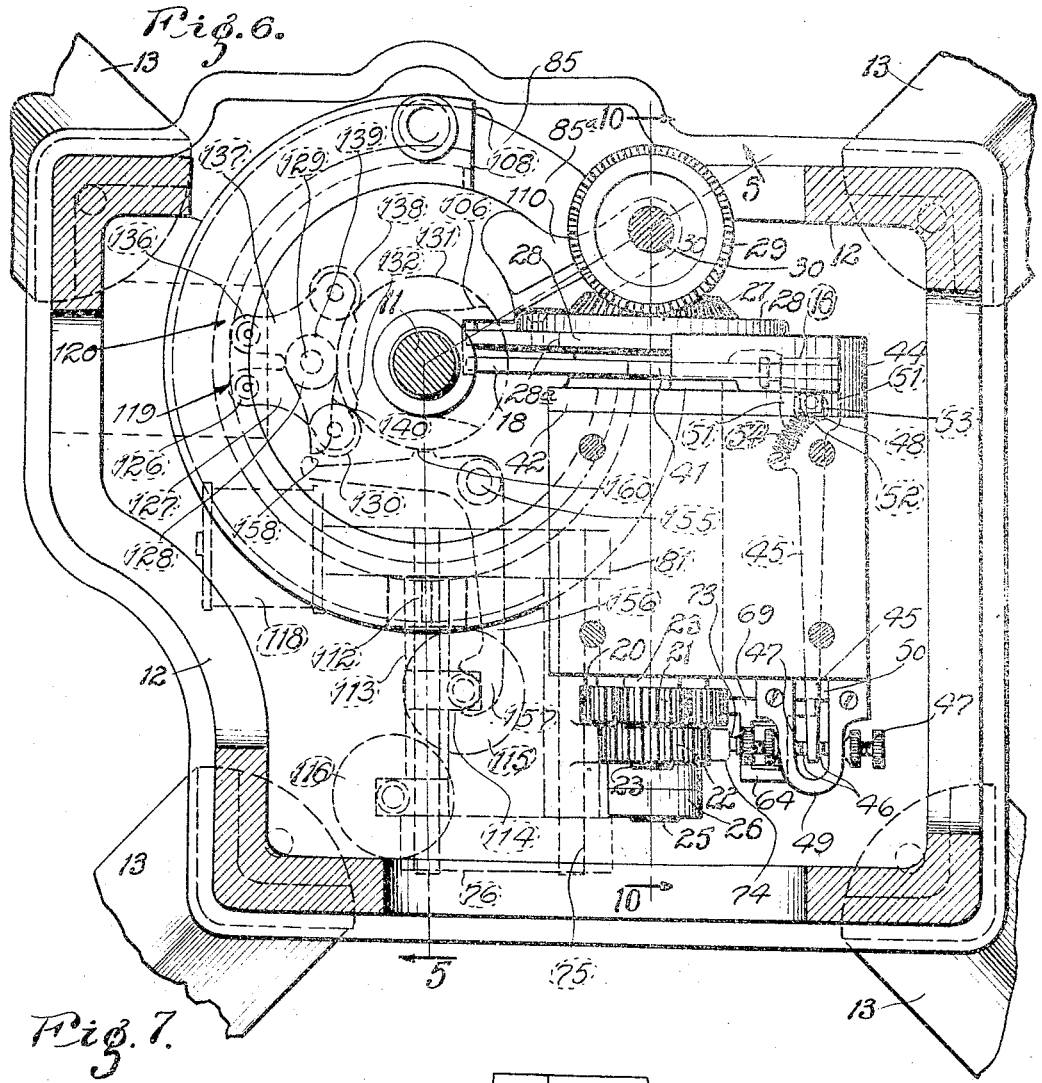
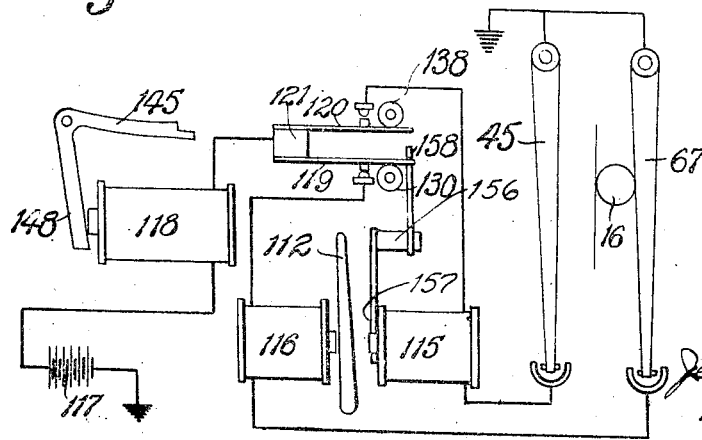
Inventor:
Jeremiah Keller
His Attorneys.

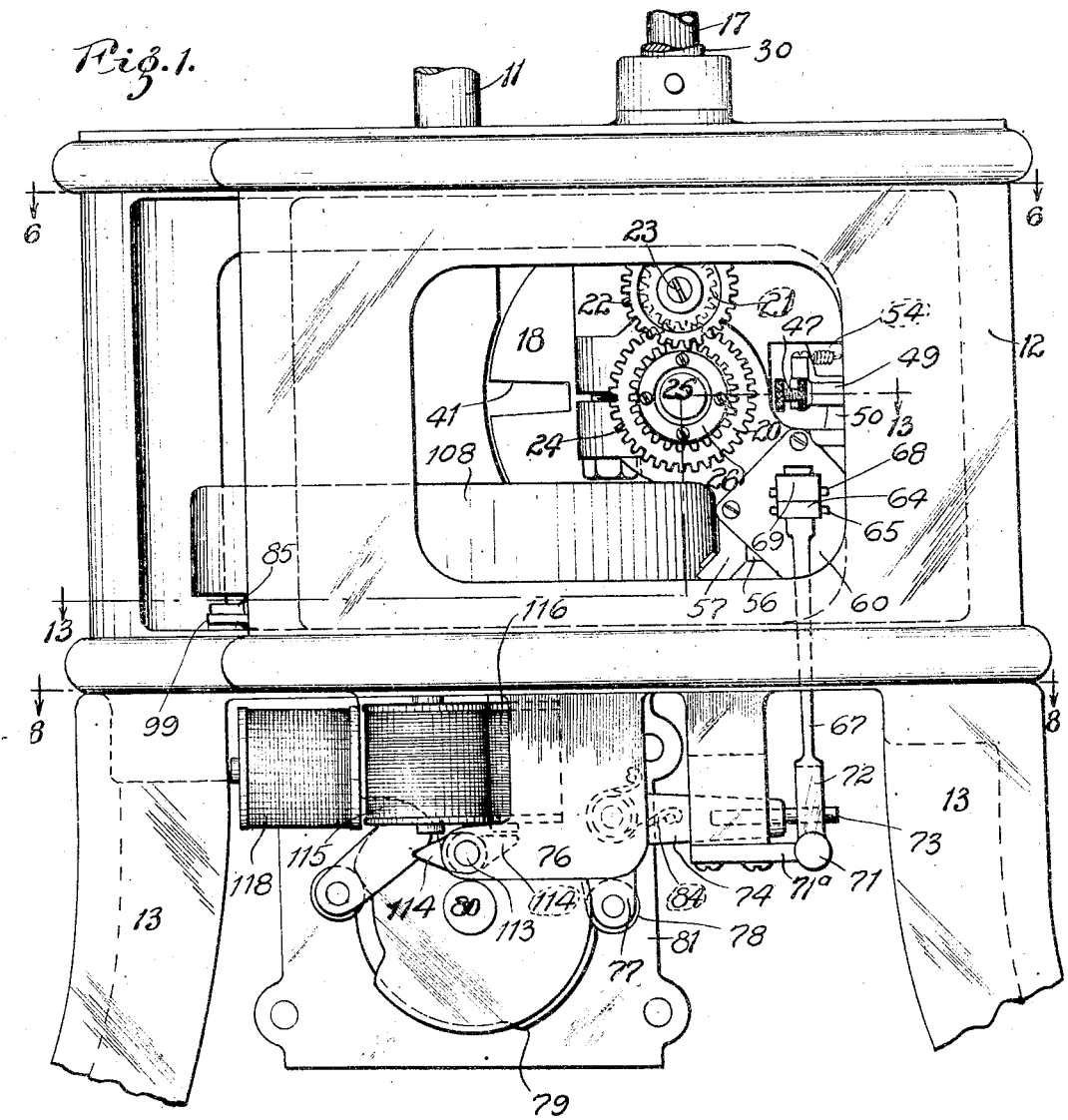
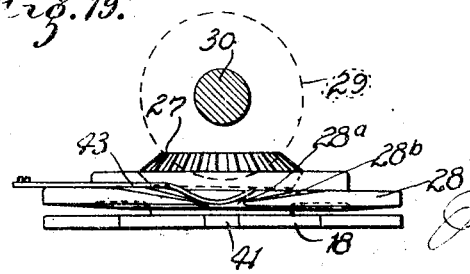

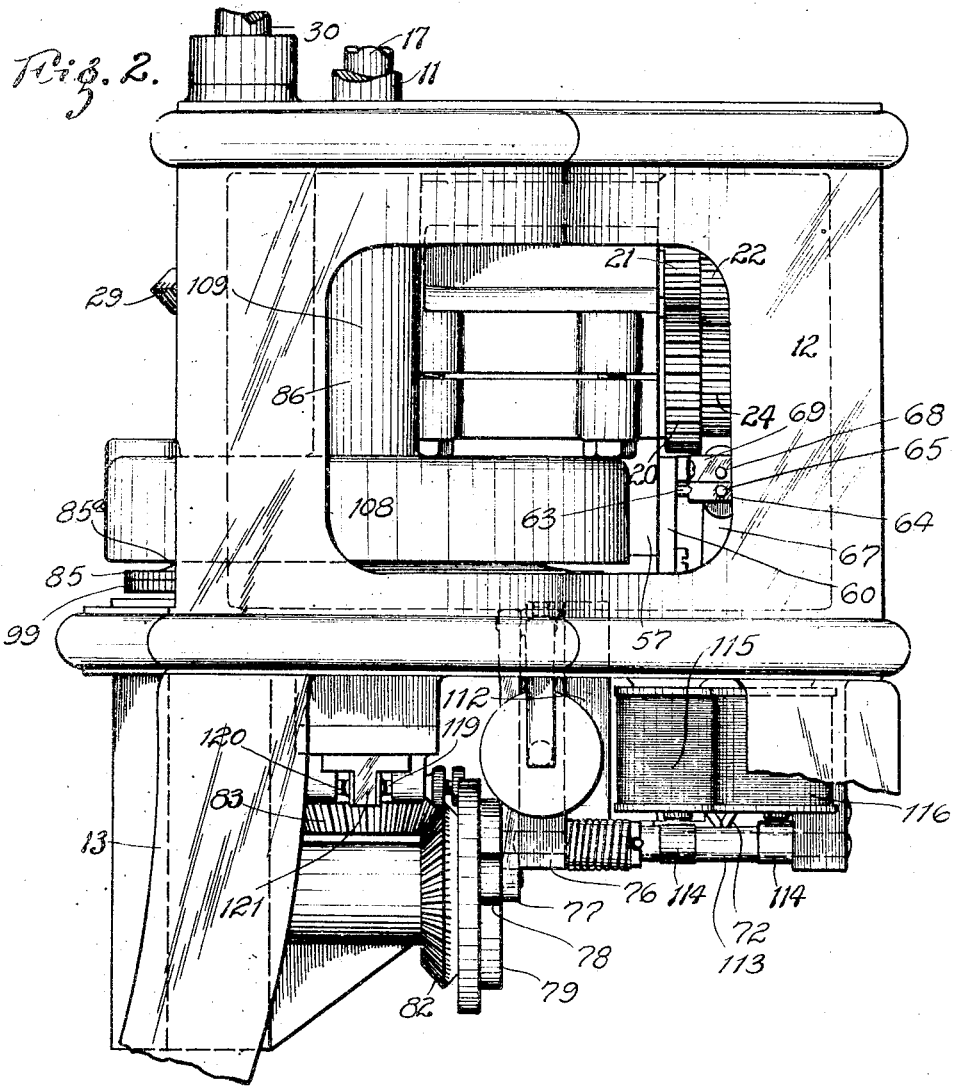

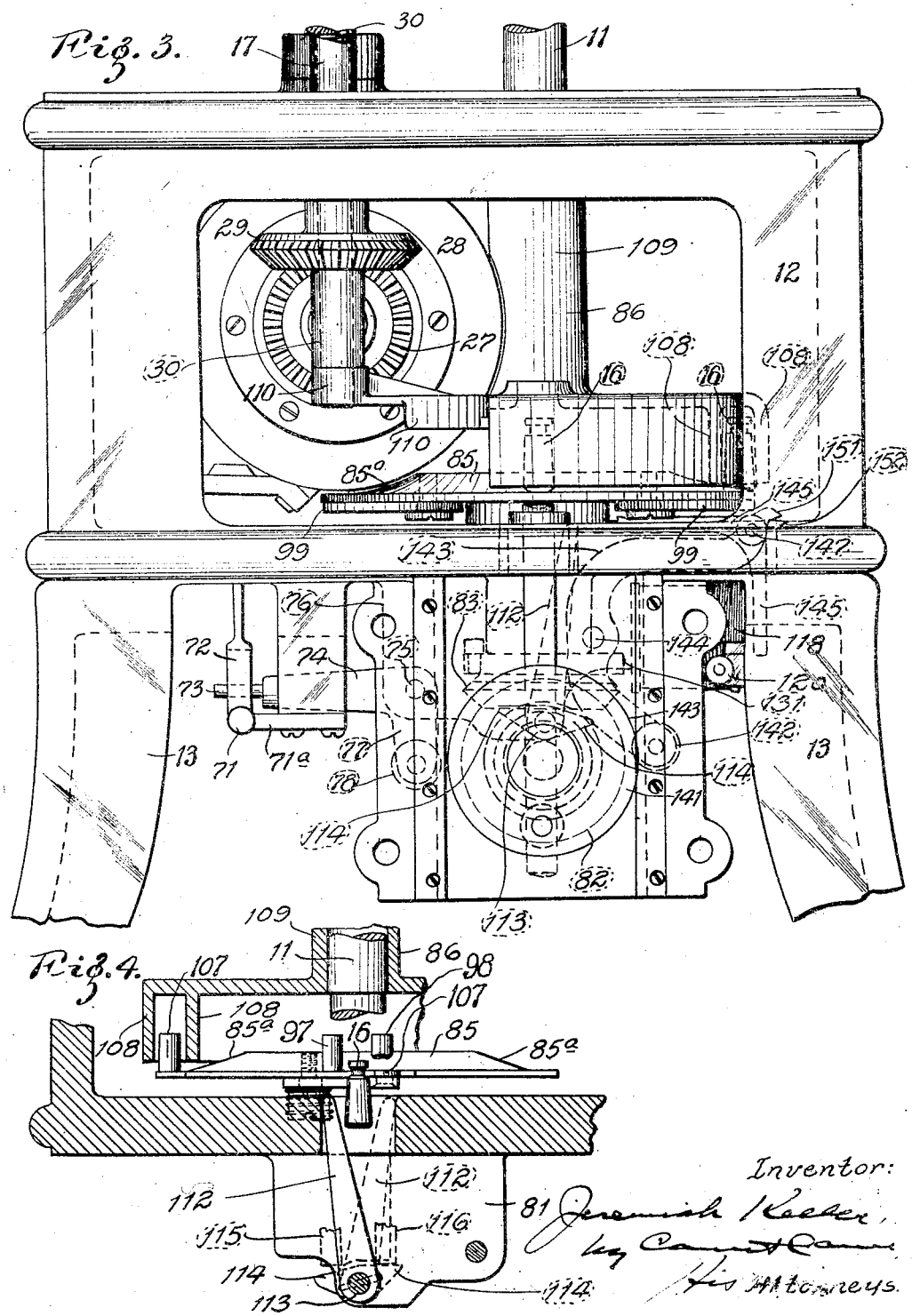

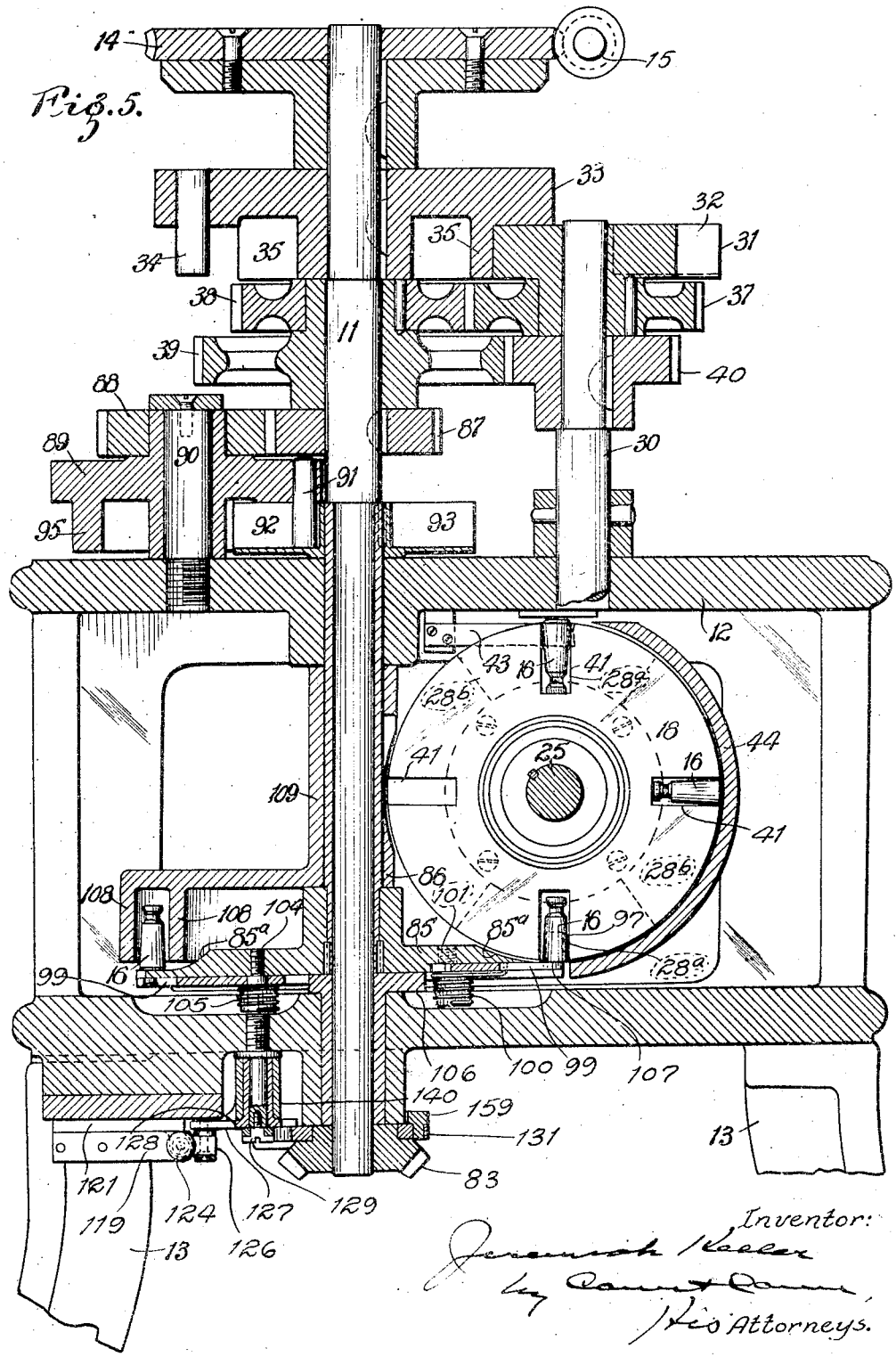

May 25, 1926.

J. KELLER 1,586,155

MACHINE FOR GAUGING ROUNDNESS AND TAPER OF ROLLS

Filed August 15, 1923    10 Sheets-Sheet 6

Inventor:
Jeremiah Keller,
His Attorneys.

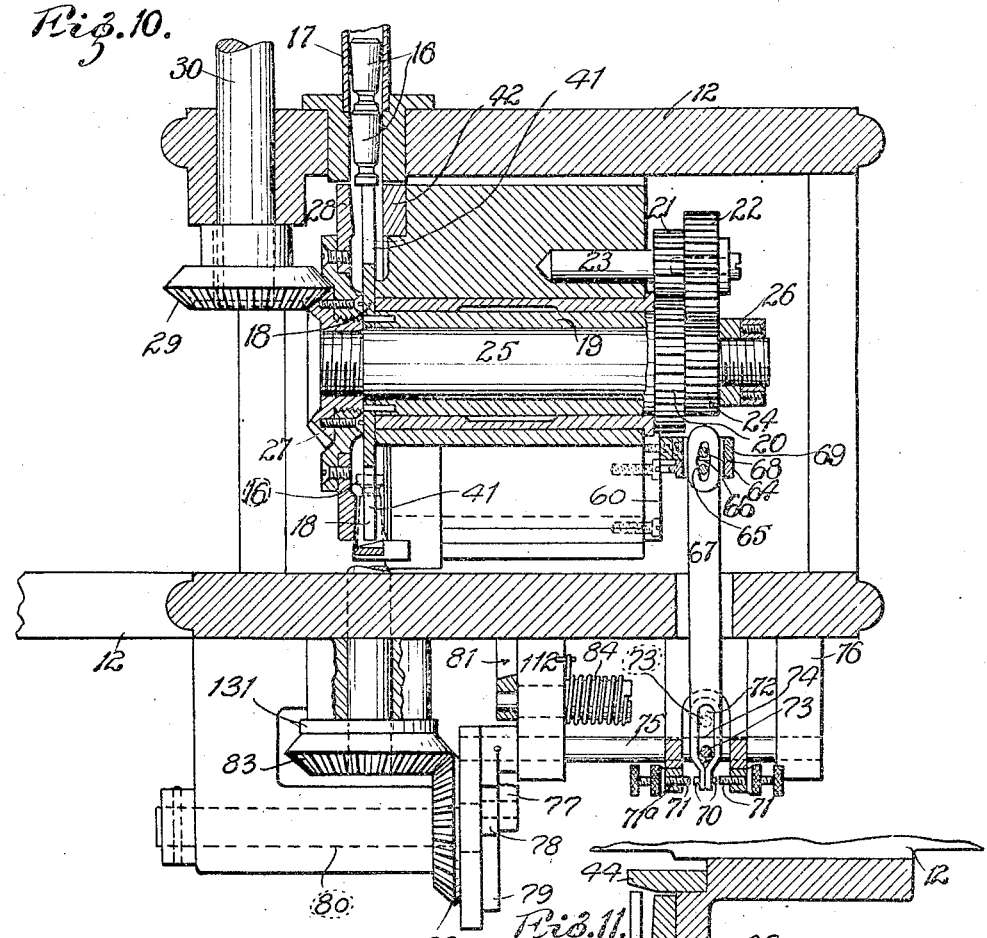

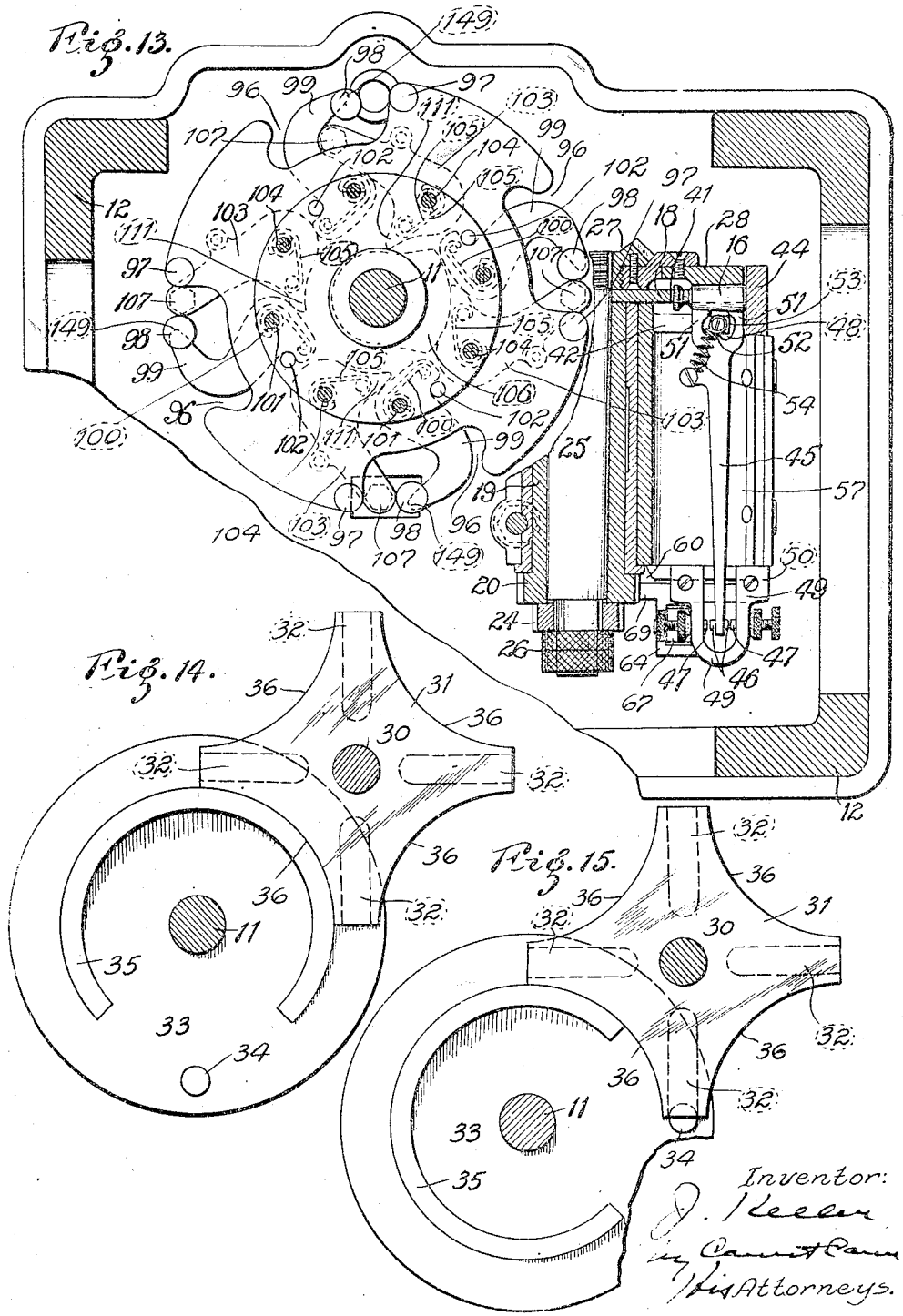

May 25, 1926.  
J. KELLER  
1,586,155  
MACHINE FOR GAUGING ROUNDNESS AND TAPER OF ROLLS  
Filed August 15, 1923   10 Sheets-Sheet 10

Patented May 25, 1926.

1,586,155

UNITED STATES PATENT OFFICE.

JEREMIAH KELLER, OF CANTON, OHIO, ASSIGNOR TO THE TIMKEN ROLLER BEARING COMPANY, OF CANTON, OHIO, A CORPORATION OF OHIO.

MACHINE FOR GAUGING ROUNDNESS AND TAPER OF ROLLS.

Application filed August 15, 1923. Serial No. 657,644.

My invention relates to machines for gauging roundness and taper of rolls, and has for its principal object a device by which rolls, particularly conical rolls for roller bearings, may be automatically gauged for roundness and taper and assorted according to whether they are of the proper roundness and taper or not. The invention consists principally in the taper gauging mechanism and roundness gauging mechanism hereinafter described and claimed and in the machine and in the parts, combinations and arrangements of parts hereinafter described and claimed.

My machine comprises mechanism for receiving rolls fed thereto and feeding said rolls to the gauging mechanism, mechanism for automatically gauging such rolls for taper and roundness, and mechanism for assorting gauged rolls. These several mechanisms are driven from a main shaft, which is provided with suitable timing apparatus for co-ordinating the various movements and functions of the different parts.

In the accompanying drawings, wherein like symbols refer to like parts wherever they occur—

Fig. 1 is a front elevation of a machine embodying my invention.

Fig. 2 is an elevation of the left side of said machine;

Fig. 3 is a rear elevation of said machine;

Fig. 4 is a detail view of the hinged gate whereby defective rolls are ejected from the machine;

Figure 8:
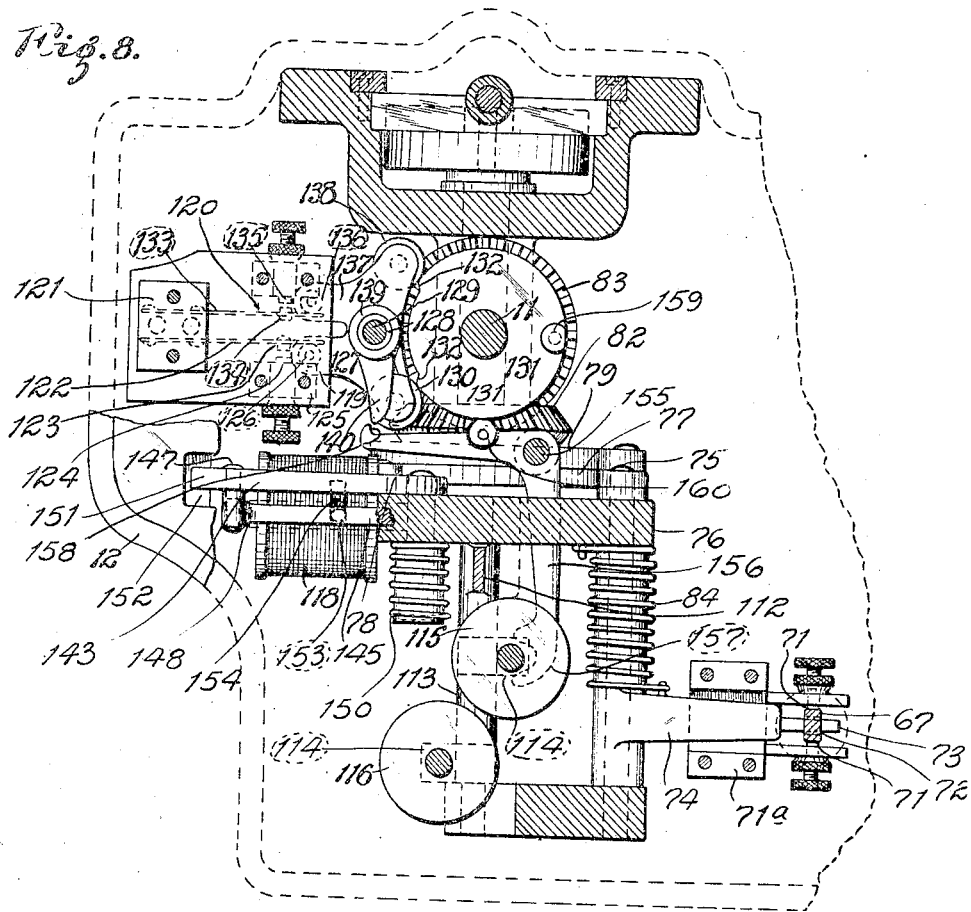
Figure 9:
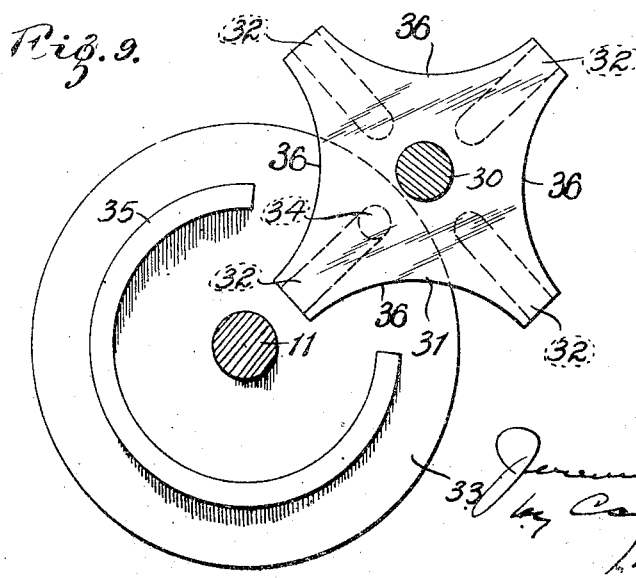
Figure 17:
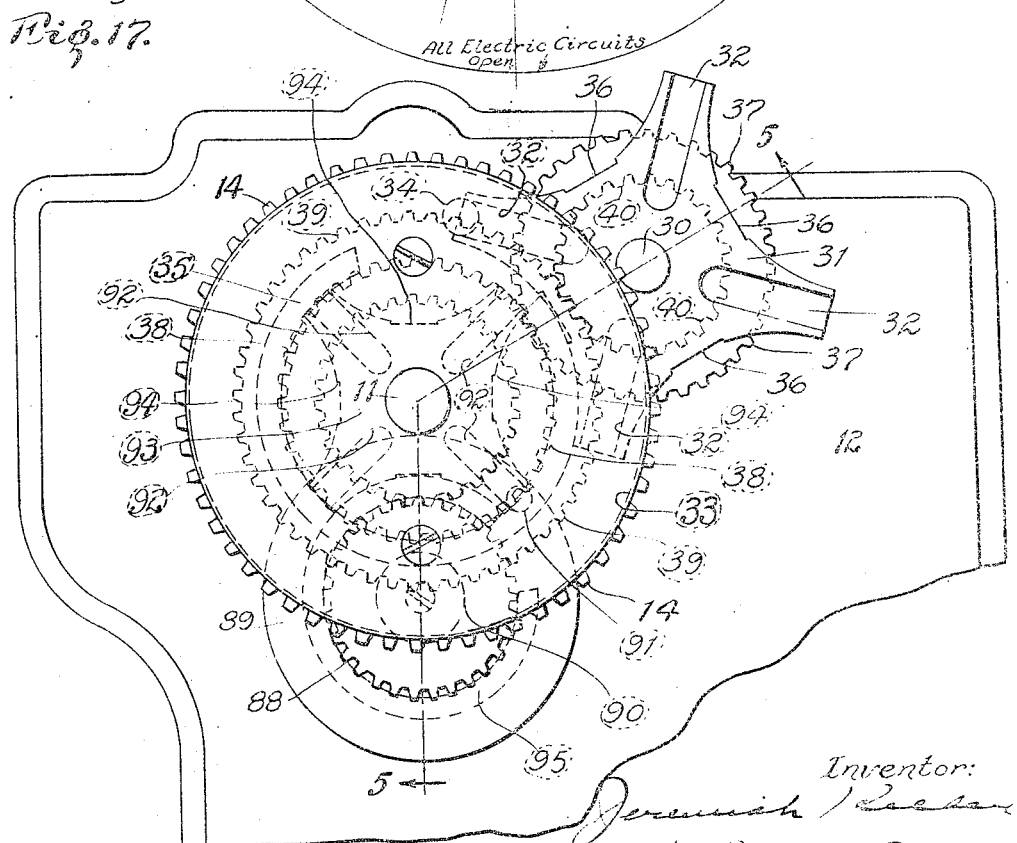

Fig. 5 is a vertical sectional view on the lines 5—5 of Figs. 6 and 17, that is, a vertical section in vertical planes passing through the main shaft, the view of the portion between the main shaft being on a plane parallel with the front of the machine, and the portion to the right of the main shaft being in the plane of the main and intermediate shafts, as indicated in said Figs. 6 and 17;

Fig. 6 is a horizontal sectional view on the line 6—6 of Fig. 1; the plane of the section extending through the housing just below the top thereof, so that most of the mechanism appears in plan;

Fig. 7 is a diagrammatic view of the electric system of the gauging devices;

Fig. 8 is a horizontal section on the line 8—8 of Fig. 1, but showing a great portion of the sorting mechanism in plan;

Fig. 9 is a detail of the intermittent driving movement by which the positioning plate is actuated from the main shaft;

Fig. 10 is a vertical sectional view of the taper gauging mechanism on the line 10—10 of Fig. 6;

Fig. 11 is a vertical section view through the roundness gauging device;

Fig. 12 is a sectional view of the line 12—12 of Fig. 11;

Fig. 13 is a plane view on the line 13—13 of Fig. 1;

Figs. 14 and 15 are views corresponding with Fig. 9, showing the pin and star wheels in different positions.

Figure 16:
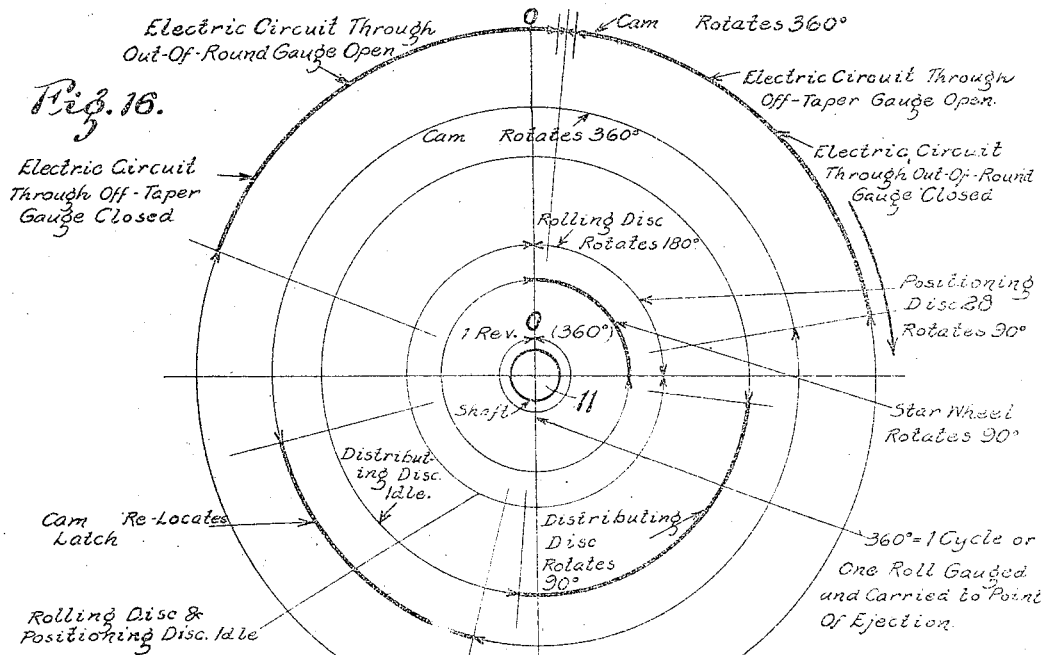

Fig. 16 is a timing diagram,

Fig. 17 is a plan view of the gearing for obtaining the intermittent rotation of the rotary disk that holds the rolls being gauged and of the rotary disk by which gauged rolls are distributed.

Figure 18:
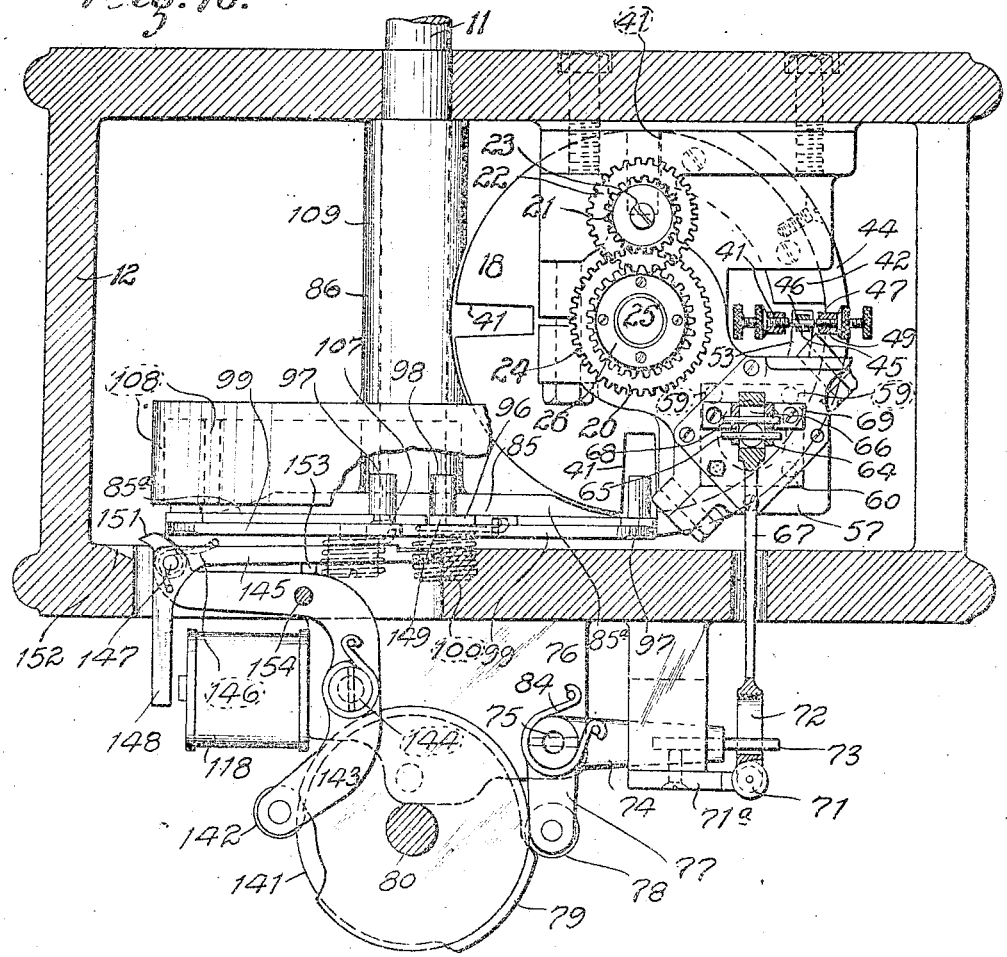

Fig. 18 is a vertical section showing the ejecting mechanism for defective rolls, and Fig. 19 is a detail view of the spring for holding rolls in place as they are fed into the positioning disk.

Referring to the accompanying drawing, the main shaft 11 of my machine is vertically mounted in a suitable framework 12, which also constitutes a housing for the gauging mechanism hereinafter described, this framework being itself preferably supported on a suitable pedestal 13.

Mounted on the upper end of the main shaft 11, is a worm gear 14, which meshes with a worm 15 and is driven by any suitable source of power.

The rolls 16 to be operated upon are fed one at a time as through a feed tube 17 to a positioning disk 18 that is fixed on a hollow shaft 19. This shaft 19 is connected with the main shaft 11 to be driven intermittently thereby as follows: Mounted on or formed integral with the end of said hollow shaft 19 is a pinion 20 which meshes with a spur pinion 21 which is fixed to or made integral with a gear 22 mounted on a pin 23 parallel with the shaft 19. Said gear 22 meshes with a pinion 24 on a stub shaft 25 that is concentric with and extends through said hollow shaft 19 and constitutes a support therefor. Suitable means, as nuts 26 on the end of the stub shaft, are provided for holding the pinions 20 and 24. Said shaft 25 projects inwardly beyond the positioning disk 18 and has a bevel pinion 27 mounted on the inner end thereof, the hub of this bevel pinion 27 is screw-threaded and has a disk 28 mounted thereon, said disk 28 being of substantially the same diameter as the positioning disk 18 hereinbefore mentioned and being spaced slightly therefrom. This disk 28 is hereinafter referred to as the rolling disk. The rolling disk is provided with a pair of diametrically opposed slots 28ª and the disk is beveled at said slots on the face away from the positioning disk as shown at 28ᵇ.

Said bevel pinion 27 is operatively connected to the source of power as hereinafter described and transmits motion both to the rolling disk 28 and to the positioning disk 18, the intermediate connections constituting a speed reducing device whereby the positioning disk rotates at a considerably lower speed than the rolling disk, preferably at one half the speed of the rolling disk. The intermediate mechanism whereby the rolling and positioning disks are connected to the main shaft is as follows:

The bevel pinion 27 which is mounted on the inner end of the stub shaft 25 meshes with a bevel pinion 29 mounted on an intermediate shaft 30 which is parallel with the main shaft 11. On the upper end of this intermediate shaft is a star wheel 31 operatively connected to said shaft 30 to drive the same and having a plurality of radial slots 32, preferably 4 slots, disposed ninety degrees apart. Fixed to the main shaft 11 is a pin wheel 33, that is, a disk that is provided with a pin 34 that projects downwardly from the lower face of the pin wheel 33 and is of proper size to enter and cooperate with the radial slots 32 of the star wheel 31. Projecting from the lower portion of the pin wheel is a rib 35 of circular curvature extending for about three-fourths of a circle, as shown in Fig. 13. The periphery of the star wheel is formed with four concave curves 36 located between the respective slots and formed with substantially the same curvature as the rib of the pin wheel. The pin 34 of the pin wheel 33 is located opposite the middle point of the gap between the ends of the circular rib 35.

By this arrangement, each revolution of the pin wheel 33, which is in continuous motion and makes one revolution for each turn of the main shaft 11, causes the pin 34 to enter one of the slots 32 of the star wheel 31 and move said star wheel through one-fourth of a revolution, and leaves the next slot 32 in position to receive said pin 34 on the next revolution of said pin wheel; the star wheel 31 being meanwhile locked against rotation by the circumference of the rib 35 fitting in the adjacent concavity 36 of the star wheel 31, the star wheel becoming unlocked when the end of the rib reaches the mid-point of said concavity, which point is reached simultaneously with the entry of the pin 34 into the slot 32 of the star wheel.

As the main shaft 11 rotates at relatively slow speed, it is desirable to obtain a quicker movement of the intermediate shaft 30; and for this purpose, it is preferable to mount the star wheel 31 loosely on the intermediate shaft 30 and provide it with a gear wheel 37 which meshes with a pinion 38 of smaller diameter that is fixed on the hub of a second gear 39 which in turn is loosely mounted on the main shaft 11 and in turn meshes with a pinion 40 which is fixed on said intermediate shaft 30. In this way, the intermediate shaft 30 is caused to rotate at higher speed than the main shaft 11 from which it is actuated.

As stated above, the rolls 16 to be gauged are fed one at a time into radially disposed slots 41 provided in the periphery of the positioning disk or roll carrier 18 that is mounted in a vertical plane on a horizontal axis; and said disk has an intermittent rotation, each movement amounting to ninety degrees. This positioning disk 18 is located between the rolling disk 28 which is mounted concentric with the positioning disk 18, on the one side and the hereinafter described gauging devices and runways 42 on the other side.

The outer portion of the face of the rolling disk 28 next to the positioning disk 18 is beveled off to conform to the standard taper of the rolls 16 to be gauged; and the runway 42 opposite said beveled portion of the rolling disk is adapted to cooperate therewith. A roll to be gauged enters the radial pocket 41 in the periphery of the positioning disk 18, when said pocket is in its uppermost position, being held in place by a spring 43 secured to the housing and extending along the upper edge of the rolling disk, its end portion extending across the opening in said disk and by the runway 42 and by the walls of said pocket 41, and thereby the roll is carried forward by said positioning disk 18. The roll is kept from moving radially outward by means of a guard plate 44 that overlaps the space between the rolling disk 18 and the runway 42 and extends through the greater portion of a semi-circle, that is, from close to the pocket 41 in its uppermost position to close to the pocket 41 in its lowermost position.

The taper gauging mechanism, that is, the mechanism whereby the taper of the roll is gauged, is located 90 degrees from the point at which the roll 16 is received into the positioning disk 18, the roll being carried to this position by the rotation of the positioning disk. In its taper gauging position, one side of the roll is pressed against the rolling disk 28, and the outer end of the roll bears against the guard plate 44. The opposite side of the roll is in contact with one end of a floating lever 45 whose other end is provided with electric contact points 46 in position to cooperate with fixed contact points 47 of electric circuits hereinafter described. The floating lever 45 rests on a portion 48 of the housing. The contact points are secured to a U-shaped member 49 that straddles the end of the lever and is mounted on an insulated block 50 on the framework. The parts are so designed that when the roll is of proper taper, the contact points 46 of the lever lie midway between the fixed contact points 47 of the electric circuits; but if the roll has too steep a taper, said lever 45 swings into contact with one of the fixed contact points 47 to close the circuit thereof, and if the roll has too little taper, said lever swings into contact with the other fixed contact point 47 to close the circuit thereof.

As stated above, the lever 45 is a floating lever, by which is meant that the lever does not have a fixed fulcrum but is free to change its position conformably to the taper of the roll 16 being gauged. For this purpose, the end of the lever 45 is forked and beveled, so that when both forks 51 thereof bear against the roll, the outer end of the lever lies midway between the fixed contact points 47. The bottom of the yoke or fork is formed into a knife edge 52 which bears against a shoe 53 which is mounted adjacent to the race-way and which extends in a curve substantially parallel with the periphery of the positioning disk 18. Attached to this shoe 53 is one end of a tension spring 54 whose other end is attached to the lever 45 some distance back of the knife edge 52 thereof and tends to pull said lever against said shoe. By this arrangement, the forks 51 of the lever extend into the path of the roll 16 to be gauged and are moved outwardly by said roll against the force of said spring 54; but at the same time, the two forks 51 of the lever, which constitute the gauging points thereof, are kept in contact with the roll near the ends thereof and thereby control the position of the outer end of said lever 45; that is to say, if the roll 16 is of proper taper, the lever 45 is not swung either to the right or to the left, but if the roll is off-taper, said lever is swung either to the right or to the left as the case may be. Very little variation from the correct taper is required to cause the lever 45 to make contact with one or the other of the fixed contact points 47 and thereby close the circuit thereof. By adjusting the fixed contact points 47 it is possible to change the amount by which a roll must be off taper to close the circuit. If the fixed contact points are very near to the contact points 46 of the lever, a roll that is very slightly off taper will close the circuit, whereas if the contact points 47 are spaced farther away from the contact points 46 of the lever the roll must vary considerably from the standard taper to close the circuit. These circuits, whose principal function is connected with the sorting and distribution of the rolls, are set forth and their operation explained hereinafter.

As stated above, the taper gauging is effected in the interval following the first movement of ninety degrees from the point at which the roll 16 enters the uppermost pocket 41 of the positioning disk 18. The next movement of said positioning disk carries said pocket and the roll 16 therein through an arc of ninety degrees to the lowermost position. It is during this movement that the roll is gauged for roundness, by mechanism about to be explained. The curved shoe 53 mentioned in connection with the taper gauging device, is fixed to or integral with a block 55 that is mounted at the end of a polygonal plunger 56 which is mounted with its longitudinal axis at right angles to the plane of the positioning disk 18 so as to be bodily movable transversely of the plane of said disk. Preferably, the plunger fits in the bore of a housing 57 provided therefor in the framework so as to be freely movable endwise therein. The plunger is provided with recesses 58 in each of which is a spring 59 that bears against a plate 60 that closes the end of the bore in which the plunger fits. The plate is secured to the framework by screws. Thus the plunger is always forced toward the positioning disk by the pressure of the springs. A stop screw is provided for the plunger.

The back portion of the plunger 56 is hollowed out to receive a friction element that has frictional engagement with the inner wall of said bore but is capable of sliding endwise of said bore when the pressure is sufficient to overcome the frictional engagement. This friction element is in the form of a central disk 61 with cylindrical extensions 62 on both sides, the extensions being slitted inwardly from their ends to form resilient arms for yieldably engaging the inner surface of the plunger.

Attached to the central disk 61 is a rod 63 which extends through a hole provided therefor in the plate that constitutes the end wall of the plunger chamber, and terminates in a yoke 64 or open link. This yoke portion has a horizontal cross-pin 65 which extends through a vertically elongated slot 66 in the upper end of a vertically disposed link 67. Also extending through the upper portion of said slot 66 is a second horizontal pin 68 which is fixed to a stationary bracket 69 of part of the framework. The two pins 65 and 68 are adapted to make contact with both sides of the slot 66, the pin 68 constituting the pivot about which the link 67 swings when actuated by the pin 65. The operation of the mechanism is as follows:

When the positioning disk 18 moves the roll 16 forward, the roll is pressed against the rolling disk 28 by the shoe 53 on the end of the plunger 56, which in turn is pressed endwise by the springs 59. At the same time, the rolling disk 28 against which the roll 16 is thus pressed, is traveling at higher speed than the positioning disk, as hereinbefore described and the shoe 53 remains stationary so far as the rotary movement is concerned. In consequence of these conditions, the roll is caused to rotate on its own axis, that is to say, it rolls on the surface of the rolling disk 28 and also on the plunger mounted shoe 53 that is pressed against it. During this rolling movement the entire circumference of the roll is presented successively to said movable shoe 53; and if the diameter of the roll varies at all, such variation causes the plunger 56 to move inwardly or outwardly, as the case may be, transversely of the rolling disk; and this movement of the plunger 56 is transmitted through the friction element and the rod 63 attached thereto to the vertical link 67 near whose fulcrum said rod 63 is pivotally attached. The lower end of the link 67 carries electric contact points 70 in position to cooperate with fixed contact points 71 of electric circuits hereinafter described. Said fixed contact points are mounted on a suitable member 71ª secured to the frame of the machine.

As stated above, the friction element has frictional engagement with the plunger 56 to reciprocate therewith and is also adapted to slide endwise in said plunger when submitted to sufficient pressure to overcome its friction. The principal object of this feature is to adapt the device automatically to the gauging of rolls of different sizes. For this purpose the lower end of the link 67 is slotted or formed into a yoke 72 into which extends a pin 73 that is mounted in the end of an arm 74 that is mounted on a rock shaft 75. The lower portion of the slot 72 is narrow enough to hug the pin 73 on both sides thereof but the upper portion of the slot is considerably wider than the pin, so as to permit the link 67 to swing far enough to make contact with the electrical terminals 71 when the pin is moved to such wider portion of the slot. When the pin 73 is in the lower portion of the slot 72, it locks the lower end of the link 67 against movement; and as the upper end of the link is locked against movement by its supporting pin 68, the pressure of the plunger 56 transmitted through the friction element and connecting rod 63 is ineffective to move said link 67; so that when the link is locked, the friction element is held against movement by said link and the rod connected to said element, and the plunger 56 slides over said friction element. In operation, the parts are so organized that the link is normally locked against movement and is released only when the roll is in position to be gauged for roundness, i. e. after the plunger has accommodated itself to the roll by moving along the friction element.

The rock shaft 75 by which the pin 73 is supported is pivotally mounted in a member 76 that projects downwardly from the frame. To said shaft 75 is secured a downwardly projecting arm 77 that has a roller 78 thereon. The roller 78 is adapted to be engaged by a cam portion on a disk 79 that is secured to a horizontally disposed stub shaft 80 that is mounted in a suitable member 81 that depends from the frame of the machine. Said shaft 80 is provided with a gear 82 that meshes with a gear 83 on the bottom of the main drive shaft 11 of the machine. Thus the locking pin is periodically raised to unlock the lever, such unlocking as above stated, occurring when a roll is in position to be gauged by the roundness gauging mechanism and after the plunger has accommodated itself to the roll. Secured to the rock shaft is a spring 84 the other end of which is secured to the frame in any suitable manner. The force of this spring holds the parts in such position that the roller 78 is held against the disk 79 and returns the parts to locked position as soon as the roller clears the cam portion of the disk.

The continued rotation of the positioning disk 18 after the roll 16 has been carried past the roundness gauge brings the roll to a point 180° from where it was delivered into the positioning disk. The positioning disk stops with the roll in substantially vertical position in the pocket whence it drops onto the hereinafter described distributing or assorting mechanism, the guard plate terminating short of the lowermost position of the positioning disk, so as to permit the roll to drop therefrom. The distributing mechanism comprises a rotary disk or carrier 85 disposed horizontally to rotate on a vertical axis, said disk being hereinafter called "distributing disk" and other hereinafter described mechanism. The marginal portion of the disk is cut away (85ª) to conform to the edge of the positioning disk 18. The distributing disk is mounted concentric with the main shaft 11 and is driven therefrom by a suitable train of speed multiplying mechanism that operates intermittently. The mechanism illustrated is as follows:

The distributing disk 85 is secured to the lower end of a hollow shaft 86 that surrounds the main drive shaft 11. Keyed to the main shaft 11 is a gear 87 that meshes with a gear 88 that is fixed to the hub of a pin wheel 89. The pin wheel 89 is rotatable on a suitable stud 90 that is secured to the frame and is parallel with the main drive shaft 11. The pin wheel 89 has a pin 91 depending therefrom that is adapted to enter one of the four equidistant radially disposed slots 92 of a star wheel 93 that is fixed to the hollow shaft 86, to rotate the same. The star wheel 93 is provided with curved edges 94 between the slots 92 and the pin wheel 89 is provided with one of said curved edges 94 to prevent rotation of the star wheel except when the pin 91 enters one of the slots 92.

The timing devices are so correlated that the distributing disk 85 moves during the intermissions in the movement of the positioning disk 18. The distributing disk 85 is provided with four equi-distant recesses or notches 96 in its periphery, as shown in Fig. 13. It is also provided with four equidistant pins 97 at the forward ends of the respective recesses, each pin functioning as a rigid jaw for holding the roll 16 in cooperation with a movable jaw in the form of a pin 98 extending upwardly through said peripheral slot 96 and mounted on the end of a pawl 99 which in turn is pivotally mounted on the underside of said distributing disk and is provided with a spring 100 which normally presses it toward the corresponding fixed jaw. The pivot pin for said pawl is indicated in Fig. 13 by the reference numeral 101 and the back-stop therefor is indicated by the reference numeral 102.

Also pivotally mounted on the underside of said distributing disk are four spring pressed pawls 103 in the shape of bell-crank levers, the pivot pin of said spring pressed pawl being indicated in Fig. 13 by the reference numeral 104 and the spring by the reference numeral 105. The inner ends of said pawls lie in the path of a cam 106 that is fixed to the frame, said cam comprising a relatively long circular peripheral portion and a relatively short circular peripheral portion of greater radius, the two circular arcs being connected by inclined shoulders. The outer end of each bell crank pawl 103 has a "button" or seat 107 on its upper surface; and in the normal position of said pawl 103, the button 107 thereof is located in the peripheral recess of the distributing disk 85 close to the corresponding pin 97 or fixed jaw, and between said fixed jaw and the movable jaw 98. Likewise, the pawl 103 is positioned so that the button 107 is immediately below the lowermost portion of the roll pocket of the positioning disk so as to receive the roll directly therefrom by gravity. The cam 106 cooperates with the spring 105 to hold the pawl in proper position at the point where the roll drops on to said pawl.

While the positioning disk 18 is carrying the roll 16 past the roundness gauge to the point where it drops on to the spring pressed pawl 103 of the distributing disk, the beveled edge portion of one of the slots 28$^b$ of the rolling disk engages the movable pin 98 and swings it to one side where it is held by the flat surface of the rolling disk until the roll pocket 41 of the positioning disk has reached its lowermost position and the roll 16 has dropped on to the button 107. At this point one notch 28$^a$ of the rolling disk is in alinement with the pocket 41 of the positioning disk; and the movable pin 98 is permitted to swing into engagement with the roll 16. The distributing disk 85 then rotates carrying the roll out of the notches of the positioning disk, the guard pins only passing through the rolling disk and the positioning disk.

As illustrated in Fig. 5 the machine is provided with a guideway in the form of a circular arc extending through about three-fourths of a circle, i. e., from the point where rolls are delivered to the distributing disk from the positioning disk to the point where perfect rolls leave the distributing disk. This guideway comprises two walls 108 spaced apart but concentric with the main shaft and in position to receive the roll and the jaws by which it is supported. The guideway may be provided with a central sleeve portion 109 that is sleeved on the hollow shaft 86 on the main shaft and with a portion 110 that engages the intermediate shaft 30 so that the guideway is held against rotation.

By the foregoing arrangement, a roll delivered by gravity onto the button 107 of one of the gate arms 103 of the distributing disk 85 is loosely held by the movable jaw 98 between the fixed pin 97 and is at the same time supported laterally by the walls 108 of the guideway. When the distributing disk rotates, the movable gate arm 103 is moved to one side as hereinafter described and the roll is permitted to drop into a suitable receptacle.

After the rolls rae gauged, they are sorted into three lots, namely: 1. Those that are correct as to taper and roundness. 2. Those that are correct as to taper but are out of round. 3. Those that are both out-of-round and off-taper or simply off-taper. Those rolls that are correct as to both taper and roundness are delivered directly from the distributing disk into a suitable chute or container. For this purpose the spring pressed pawl 103 is provided with a toe 111 that engages the cam 106 after the distributing disk has passed the chute where defective rolls are ejected, thus swinging the pawl 103 to the side and permitting a roll to drop out.

The rolls of the other two lots are delivered into a chute that is provided with a hinged gate or skid 112 that is electrically controlled automatically by the gauged roll. This gate is fixed to a rock shaft 113 provided with two arms 114 disposed on opposite sides thereof substantially at right angles to said gate. The rock arms function as the armatures for electro-magnets provided therefor on opposite sides of the shaft so as to be actuated thereby to rock said shaft; one electro-magnet 115 being in the taper gauging circuit and the other electro-magnet 116 being in the roundness gauging circuit. Thus the shaft 113 is rocked in one direction or the other depending on whether the gauged roll is off taper or out of round and the gate 112 is moved to the proper position.

When closed, the circuit of the electro-magnet 115 of the taper gauging circuit extends from a suitable source of electrical energy 117 through an electro-magnet 118 that operates the hereinafter described mechanism for tripping the spring-pressed pawl 103 so as to permit defective rolls to drop into the chute, thence through the hereinafter described automatic switch 119 (where said circuit is normally open) thence through the electro-magnet 115 thence through one or other of the fixed contact points 47 of the taper gauging device (where said circuit is normally open) and thence through the floating lever 45 back to the source of electrical energy.

The positive terminal of the source of electricity 117 is connected by a suitable electrical conductor 201 with the trip magnet 118 and the negative terminal is grounded to the frame by a suitable conductor 202. The trip magnet is connected by a suitable electrical conductor 203 with the automatic switch support 121. The fixed contact point 124 of the automatic switch is connected by an electrical conductor 204 with the off taper magnet 115. The off taper magnet is connected by a suitable electrical conductor 205 with the fixed contact points 47 of the U-shaped member 49 and the floating lever 45 is grounded to the frame by a suitable electrical conductor 206.

The circuit of the other electro-magnet 116 of the roundness gauging circuit likewise extends from the same source of energy 117 through said trip magnet 118 just above mentioned, thence through the hereinafter described automatic switch 120 (where said circuit is normally open), thence through the electro-magnet 116 of the roundness gauging circuit thence through one of the fixed contact points 71 of the roundness gauging device (where said circuit is normally open) and thence through the link 67 back to the source of energy. It will thus be seen that if the roll is either off-taper or out-of-round or both, the trip or kick-off magnet 118 is energized, thus setting into motion the mechanism for ejecting defective rolls.

The conductors 201 and 202 and 203 are part of the roundness gauging circuit as well as of the taper gauging circuit. The fixed contact 135 of the automatic switch of the roundness gauging circuit is connected by a suitable electrical conductor 207 with the out of round electro-magnet 116. Said electro-magnet 116 is connected by a suitable electrical conductor 208 with the fixed contact points of the roundness gauging circuit and the link 67 is grounded to the frame by a suitable electrical conductor 209.

When the circuit of the electro-magnet 115 is closed at the taper gauging device, hereinbefore described, it is also closed at the automatic switch 119. When the circuit is closed through the roundness gauging mechanism it may or may not be open at the automatic switch 120 depending upon whether the roll that has just been gauged for taper and is now being gauged for roundness is off-taper or is of the proper taper. If the roll is off-taper the automatic switch 120 is open so that regardless of whether the roll is round or out-of-round, it will be delivered into the receptacle for off-taper rolls. If the roll is of proper taper the circuit of the roundness gauging device is closed through the automatic switch 120 so that if the roll is out-of-round, the circuit will be closed both at the automatic switch 120 and at the roundness gauging mechanism and the roll ejected with the out-of-round rolls. The mechanism for obtaining these results is hereinafter described.

The automatic switch mechanisms of the gauging circuits are as follows: Secured to a suitable support 121 which support is electrically connected with the trip magnet 118 hereinbefore described, is a spring 122 whose free end is provided with a contact point 123 adapted to engage a contact point 124 that is mounted on an insulated member 125 and that is connected with the electro-magnet 115 of the taper gauging circuit. A roller 126 on the end of a crank arm 127 normally holds said spring 122 away from the contact point 124, so that the circuit is open at this point. Said arm has a hub portion 128 that is pivotally mounted on a suitable pin 129 and the other end thereof is provided with a roller 130 that rides on the surface of a cam disk 131 that has a comparatively small portion of smaller diameter than the main body portion the two portions being connected by inclined shoulders 132. Thus when the roll reaches the cut-away portion of the cam 131, the pressure of the spring 122 causes it to ride down the inclined shoulder 132 to engage the small diameter portion of said cam and the contact point 123 on the said spring engages the fixed contact point 124 thus closing the circuit at this point. The cam is timed to close the circuit through the automatic switch whenever a roll is being gauged for taper.

The automatic switch of the roundness gauging circuit likewise comprises a spring member 133 that is fixed to the support 121 that is electrically connected with the trip magnet 118 and has a contact point 134 thereon that is adapted to engage a fixed contact point 135 that is electrically connected with the magnet 116 of the roundness gauging circuit. The spring 133 is normally held away from the fixed contact point 135 by a roller 136 on the end of a bell crank arm 137 that has a roller 138 at the other end that rides on the cam 131, said bell crank arm having a suitable hub portion 139. Projecting from said hub portion 139 is an arm 140 that is adapted to be engaged by the hereinafter described latch mechanism. The cam is timed to close the circuit through the automatic switch whenever a roll is being gauged for roundness, means being provided, as hereinafter described, for preventing the closing of the circuit when a roll is found to be off taper.

After the spring-pressed pawl 103 on the distributing disk 85 has received a roll 16 from the positioning disk 18, the distributing disk is rotated through an angle of about ninety degrees, at which point the spring-pressed pawl 103 bearing the roll is above the chute into which defective rolls are ejected. Mounted on the shaft 80 on which the cam 79 that operates the locking mechanism for the link 67 of the roundness gauging device is mounted, is a cam disk 141 that bears against a roller 142 on the end of a bell crank lever 143 that is mounted on a suitable pin 144 that is secured to the framework. Secured to the upper end of the bell-crank lever 143 so as to swivel thereon in a vertical plane is a second bell-crank lever 145 hereinafter called trip lever. A suitable spring 146 is mounted on the pivot pin 147 of the trip lever to bear against the trip lever, so that the trip lever stays in a given position relative to the bell-crank lever 143 until sufficient force is applied to it to overcome its frictional engagement therewith. When the cam portion of the cam disk 141 presses against the roller 142 on the bell-crank lever 143 it swings said lever and brings the downwardly depending arm 148 of the trip lever 145 into proximity with the trip magnet 118. As above described, this trip magnet is energized both by off-taper rolls and by out-of-round rolls. When the magnet 118 is energized, the downwardly depending arm 148 of the trip lever 145 is attracted thereto, and thus the other end of the trip lever is swung upwardly so that it is in position to engage a lug 149 on the underside of the spring-pressed pawl 103 on which the roll 16 rests. By reason of the frictional engagement of the trip lever 148 with the bell crank lever, the trip lever is retained in its tripping position until the roll that has been gauged is delivered to the distributing disk and brought into position for the pawl to be tripped. The end of the trip lever extends beyond the point of delivery for defective rolls so as to trip the pawl 103 as it approaches the delivery point.

After the pawl 103 has been tripped and the roll ejected into the chute for defective rolls, the continued rotation of the distributing disk 85 and of the cam 141 brings the roller 142 to the recessed portion of the cam disk 141. A suitable spring 150 secured to the bell-crank lever 143 and to the framework of the machine causes the roller 142 to ride into the recessed portion of the cam 141 and swings the bell-crank lever away from tripping position. At the same time a projecting portion 151 of the trip lever strikes a cooperating cam surface 152 on the housing and swings the trip lever out of tripping position. A pin 153 on the trip lever engages a pin 154 that projects from the bell-crank lever to prevent the trip lever from being swung too far.

The hereinbefore mentioned latching mechanism for holding the out-of-round gauging circuit open when a roll 16 has been found to be off-taper is as follows: Mounted on a suitable member 155 in the framework is a bell-crank lever 156 hereinafter called latch lever, that has one arm 157 formed into an armature for the electro-magnet 115 of the taper gauging circuit. After this electro-magnet 115 is energized by reason of an off-taper roll being gauged, the armature portion 157 of said latch lever 156 is attracted. The other end of the latch lever has a hooked portion 158 at the end that is swung into position to engage the projecting arm of the crank arm 137 that operates the automatic switch 120 of the roundness gauging circuit, thus preventing the roller 136 from following the depression in the cam 131 and holding the circuit open at the automatic switch. Thus, even if the roll is out-of-round, as well as off-taper, the gate 112 will remain in position to deliver the roll into the off-taper receptacle. A lug 159 mounted on the cam 131 engages a projection 160 on the arm of the latch lever 156 to reset the latch lever.

The operation of the machine has been described in detail in connection with the description of the construction thereof but it may be summarized as follows:

The feed tube is kept filled with rolls which are automatically fed one at a time, to the positioning disk 18. A roll is fed into a pocket 41 of the positioning disk, where it is held by the runway 42 on the housing, the walls of the pocket 41 of the positioning disk 18 and the spring 43 that is disposed alongside the rolling disk 28. The positioning disk 18 and rolling disk 28 are then rotated, the rolling disk rotating twice as fast as the positioning disk, so that the slots of the two disks do not remain in alinement, and the roll is held between the raceway portion of the rolling disk and the runway on the housing. The positioning disk 18 is rotated ninety degrees, thus bringing the roll into engagement with the taper gauging mechanism. Here the roll, if it is off-taper, closes the circuit at the taper gauge. The circuit is still open at the automatic switch 119 of the taper gauging system and remains open until the distributing disk has carried the previously gauged roll past the point where defective rolls are ejected. The circuit is then closed through the automatic switch 119 of the taper gauging system by the cam 131 moving the crank arm 127. The bell crank lever 143 is moved by its cam 141 so that if the roll is off taper the armature 148 of the trip lever 145 is attracted by the energized trip magnet 118 and the trip lever is moved into tripping position; one arm 114 of the rock shaft 113 is attracted by energized off taper magnet 115 so that the hinged gate 112 is moved into off-taper position, and the means for closing the circuit through the automatic switch 120 of the roundness system is latched, so as to prevent the gate 112 from being moved into out-of-round position.

If the roll is of proper taper, no contact is made between the floating lever contact 46 and the fixed contact 47 and the electric circuit remains open at the taper gauging device; and although the bell crank lever 143 is moved by its cam 141, the trip lever 145 is not set in tripping position because the off taper magnet 118 is not energized. The positioning disk 18 is then rotated ninety degrees to carry the roll 11 past the roundness gauging device, the distributing disk remaining stationary. As the roll passes the roundness gauging device, the electric circuit is closed through the automatic switch 120 of the roundness system (if the roll is of the proper taper). The link 67 is locked against movement long enough for the plunger 56 to accommodate itself to the roll 11 and then the shaft 75 is rocked to move the pin 73 to the wide part of the slot 72, thus releasing the link. If the roll is out-of-round, it actuates the plunger 56 which actuates the rod 63 and link 67 at the end of the link and causes the electric circuit of the roundness gauging system to be closed. The gate 112 is moved into out-of-round position by reason of an arm 114 of the rock shaft 113 being attracted by the energized out-of-round electro-magnet 116. If the roll is off-taper, the circuit is not closed at the automatic switch 120 (by reason of the latching means hereinbefore described) and therefore the roundness gauging system is inoperative. Thus at the end of the rotation of the positioning disk, the ejecting mechanism is set so that the roll will be ejected into the proper receptacle from the distributing disk.

After the positioning disk 18 has carried the roll past the roundness gauging device, it stops with the pocket 41 extending downwardly, 180 degrees away from the position that it was in when it received the roll. The roll drops from the positioning disk onto a pawl 103 of the distributing disk 85.

The positioning disk 18 remains stationary while the distributing disk rotates. When the distributing disk has rotated 90 degrees, the roll holding pawl 103 is tripped by the lever 145, if the roll is off-taper or out-of-round or both. If the roll 11 is round and of the proper taper, it is carried past the point for ejecting defective rolls and is ejected when the toe 111 of the roll holding pawl 103 contacts with the cam 106. A complete cycle of operations is shown in Fig. 16 beginning with a roll in engagement with the off-taper gauging device and ending at the point where a defective roll is ejected.

The herein described gauging machine has numerous advantages. It automatically gauges and assorts rolls for roundness and taper. The gauging devices are accurate and accommodate themselves to rollers of various sizes.

Obviously, numerous changes may be made without departing from the invention and I do not wish to be limited to the precise constructions shown.

What I claim is:

1. A machine for gauging rolls comprising a rotary disk adapted to receive rolls, a taper gauging device, disposed in the path of a roll in said rotary disk, a second rotary disk provided with pawls adapted to receive rolls from said first mentioned disk, said taper gauging device being in an electric circuit adapted to be closed by an off-taper roll and a tripping device actuated by said electric circuit to trip a pawl carrying a roll that is off taper.

2. A machine for gauging rolls comprising a carrier adapted to receive rolls, a taper gauging device, disposed in the path of a roll in said carrier, a second carrier provided with pawls adapted to receive rolls from said first mentioned carrier, said taper gauging device being in an electric circuit adapted to be closed by an off-taper roll and a tripping device actuated by said electric circuit to trip a pawl carrying a roll that is off taper.

3. A machine for gauging rolls comprising a carrier adapted to receive rolls, a taper gauging device disposed in the path of a roll in said carrier, a second carrier adapted to receive a gauged roll from said first mentioned carrier, said taper gauging device being in an electric circuit adapted to be closed by the action of an off-taper roll on said gauging device and means set by said electric circuit for ejecting an off-taper roll from said second carrier.

4. A machine for gauging rolls comprising a rotary disk adapted to receive rolls, a taper gauging device disposed in the path of a roll in said rotary disk, a second rotary disk provided with pawls adapted to receive rolls from said first mentioned disk, said taper gauging device being in an electric circuit adapted to be closed by an off-taper roll and a tripping device actuated by said electric circuit to trip the pawl of said second disk carrying said off taper roll.

5. A machine for gauging rolls comprising a carrier adapted to receive rolls, a taper gauging device, a roundness gauging device, said gauging devices being disposed in the path of a roll in said carrier, a second carrier adapted to receive rolls from said first mentioned carrier said taper gauging device and said roundness gauging device being in an electric circuit adapted to be closed by an off-taper roll and by an out of round roll, a tripping device actuated by said electric circuit to trip a pawl carrying a roll that is defective, and a hinged gate adapted to be swung in one direction to receive a roll that is out of round and to be swung in the opposite direction to receive a roll that is off taper, said taper gauging device being in an electric circuit adapted to swing said gate into off taper position and said roundness gauging device being in an electric circuit adapted to swing said gate into out of round position.

6. A machine for gauging rolls comprising a carrier adapted to receive rolls, a taper gauging device, a roundness gauging device, said gauging devices being disposed in the path of a roll in said carrier, a second carrier provided with pawls adapted to receive rolls from said first mentioned carrier said taper gauging device and said roundness gauging device being in an electric circuit adapted to be closed by an off-taper roll and by an out of round roll means actuated by said electric circuit for ejecting a roll that is defective, and a hinged gate adapted to be swung in one direction to receive a roll that is out-of-round and to be swung in the opposite direction to receive a roll that is off taper, said taper gauging device being in an electric circuit adapted to swing gate into off taper position and said roundness gauging device being in an electric circuit adapted to swing said gate into out-of-round position.

7. In a machine of the kind described, a taper gauging mechanism comprising a support, a lever having a forked end straddling said support, a spring secured to said support and said lever whereby the ends of the lever project beyond the face of the support to engage a roll and the crotch of the fork rests against said support, whereby a roll engaging the forks of said lever forces it away from said support and swings it to one side if the roll is off taper.

8. A machine for gauging rolls comprising a carrier adapted to receive rolls, a roundness gauging device, disposed in the path of a roll in said carrier a second carrier adapted to receive rolls from said first carrier said roundness gauging device being in an electric circuit adapted to be closed by an out-of-round roll and means actuated by said electric circuit for ejecting a roll that is out-of-round from said second carrier.

9. A machine for gauging rolls comprising a rotary disk adapted to receive rolls, a roundness gauging device disposed in the path of a roll in said rotary disk, a second rotary disk provided with pawls adapted to receive rolls from said first mentioned disk, said roundness gauging device being in an electric circuit adapted to be closed by an out-of-round roll and a tripping device actuated by said electric circuit to trip the pawl of said second disk carrying said out-of-round roll.

10. A machine for gauging rolls comprising a carrier adapted to receive rolls, a roundness gauging device disposed in the path of a roll in said rotary disk, a second carrier provided with pawls adapted to receive rolls from said first carrier said roundness gauging device being in an electric circuit adapted to be closed by an out-of-round roll and a tripping device actuated by said electric circuit to trip a pawl carrying a roll that is out-of-round.

11. A machine for gauging rolls, comprising a carrier adapted to receive rolls, a roundness gauging device disposed in the path of a roll in said carrier, a second carrier adapted to receive a roll from said first mentioned carrier, said roundness gauging device being in an electric circuit adapted to be closed by the action of an out-of-round roll on said gauging device and means set by said electric circuit for ejecting an out-of-round roll from said second carrier.

12. A device for gauging rolls for roundness comprising a carrier for supporting the rolls to be gauged, a hollow plunger mounted adjacent to said carrier and movable toward and away from said disk, resilient means for pressing said plunger toward said carrier, said plunger having a portion that contacts with a roll in said carrier, means for rotating said roll, a friction element in said plunger, an arm projecting from said friction element and means for locking said arm against movement when a roll engages the end of said hollow plunger, thus permitting movement of the plunger on the friction element and for releasing said arm to permit movement of the hollow plunger and friction element as a unit.

13. A machine for gauging rolls comprising a taper gauging device, a roundness gauging device means for carrying a roll past said taper gauging device and said roundness gauging device and means set by said gauging devices for sorting the rolls after they have been carried past said gauging devices.

14. A machine for gauging rolls comprising a taper gauging device, a roundness gauging device, means for carrying a roll past said taper gauging device and said roundness gauging device and means set by said gauging devices for sorting the rolls after they have been carried past said gauging devices into three lots, namely, rolls that are correct as to taper and roundness, rolls that are out-of-round, and rolls that are off taper or both out-of-round and off-taper.

15. A machine for gauging rolls comprising a taper gauging device, a roundness gauging device, means for carrying a roll past said taper gauging device and roundness gauging device and means set by said gauging devices for sorting the rolls after they have been carried past said gauging devices.

16. A machine for gauging rolls comprising a taper gauging device, a roundness gauging device, means for carrying a roll past said taper gauging device and roundness gauging device and means set by said gauging devices for sorting the rolls after they have been carried past said gauging devices, said means comprising a trip device actuated by said gauging devices for ejecting defective rolls and a hinged sorting gate operatively connected with said gauging devices to be swung in one direction to receive off taper rolls and to be swung in the opposite direction to receive out-of-round rolls.

17. A machine of the kind described comprising a vertically disposed rotary disk adapted to receive rolls to be gauged, a taper gauging device disposed adjacent to said disk in position to be engaged by a roll therein, a roundness gauging device disposed adjacent to said disk in position to be engaged by a roll after it has passed the taper gauging device, a horizontally disposed rotary disk adapted to receive a roll from said vertical disk after it has passed the gauging devices, a chute for defective rolls, means controlled by said taper gauging mechanism and said roundness gauging mechanism for sorting rolls in said chute, and means controlled by said gauging mechanism for ejecting rolls into said chute.

18. A machine of the kind described comprising a vertically disposed rotary disk adapted to receive rolls to be gauged, a taper gauging device disposed adjacent to said disk in position to be engaged by a roll therein, a roundness gauging device disposed and adjacent to said disk in position to be engaged by a roll after it has passed the taper gauging device, a horizontally disposed rotary disk adapted to receive a roll from said vertical disk after it has passed the gauging devices, a chute for defective rolls, means controlled by said taper gauging mechanism and said roundness gauging mechanism for sorting rolls in said chute, and means controlled by said gauging mechanism for ejecting rolls into said chute and means for ejecting perfect rolls from said horizontal disk.

19. A gauging machine comprising a vertically disposed rotary disk provided with pockets adapted to receive rolls to be gauged, gauging devices disposed adjacent to said disk in position to be engaged by a roll therein, a horizontally disposed rotary disk having a portion extending under said vertically disposed disk to receive a roll therefrom and means for sorting rolls of correct taper and roundness from the others.

20. A machine of the kind described comprising a carrier for receiving rolls to be gauged, a taper gauging device disposed adjacent to said carrier in position to be engaged by a roll therein, a roundness gauging device disposed adjacent to said carrier in position to be engaged by a roll after it has passed the taper gauging device, a second carrier adapted to receive a roll from said first carrier after it has passed the gauging devices, a chute for off taper and out-of-round means controlled by said taper gauging device and said roundness gauging device for sorting rolls in said chute, and means controlled by said gauging devices for ejecting rolls into said chute.

21. A machine of the kind described comprising a carrier for receiving rolls to be gauged, a taper gauging device disposed adjacent to said carrier in position to be engaged by a roll therein, a roundness gauging device disposed adjacent to said carrier in position to be engaged by a roll after it has passed the taper gauging device, a second carrier adapted to receive a roll from said first carrier after it has passed the gauging devices, a chute for off taper and out-of-round rolls, means controlled by said taper gauging device and said roundness gauging device for sorting rolls in said chute, and means controlled by said gauging devices for ejecting rolls into said chute and means for ejecting from said second carrier rolls that are correct as to taper and round.

22. A device for gauging rolls for roundness comprising a rotary disk for carrying the rolls to be gauged, a hollow plunger mounted adjacent to said rotary disk and movable toward and away from said disk, resilient means for pressing said plunger toward said disk, said plunger having a shoe secured to the end thereof said shoe having an arcuate portion disposed alongside of said disk and constituting a runway for a roll and means for rotating said roll while in engagement with said shoe.

23. A device for gauging rolls for roundness comprising a rotary disk for carrying the rolls to be gauged, a hollow plunger mounted adjacent to said rotary disk and movable toward and away from said disk, resilient means for pressing said plunger toward said disk, said plunger having a shoe secured to the end thereof said shoe having an arcuate portion disposed alongside of said disk and constituting a runway for a roll and means for rotating said roll while in engagement with said shoe, said means comprising a disk alongside of said first mentioned disk and rotating at a higher speed, said second disk contacting with a roll in said carrying disk.

24. A device for gauging rolls for roundness comprising a carrier for supporting the rolls to be gauged, a hollow plunger mounted adjacent to said carrier and movable toward and away from said disk, resilient means for pressing said plunger toward the carrier, said plunger having a portion that engages a roll in said carrier, means for rotating said roll, a friction element in said plunger, an arm projecting from said friction element and means for locking said arm against movement when a roll engages the end of said hollow plunger, thus permitting movement of the plunger on the friction element and for releasing said arm to permit movement of the hollow plunger and friction element as a unit, and an ejecting mechanism said ejecting mechanism being in an electric circuit that is closed by the movement of said plunger.

25. In a roll gauging machine, a frame, a hollow plunger having a portion adapted to engage a roll, said plunger being movable toward and away from a roll, resilient means tending to keep said plunger in engagement with a roll, a friction element in said plunger, a rod projecting from said friction element, a pin secured to a portion of the frame, a link having a slot in the end whereby it is pivotally supported on said pin, said rod having a member extending into said slot, whereby said link is rocked by the movement of said rod, means for holding said link against movement and for permitting movement thereof.

26. In a roll gauging machine, a frame, a hollow plunger having a portion adapted to engage a roll, said plunger being movable toward and away from a roll, resilient means tending to keep said plunger in engagement with a roll, a friction element in said plunger, a rod projecting from said friction element, a pin secured to a portion of the frame, a link having a slot in the end whereby it is pivotally supported on said pin, said rod having a member extending into said slot, whereby said link is rocked by the movement of said rod, and means for holding said link against movement and for permitting movement thereof, said means comprising a lock pin extending into a slot provided therefor in said link and means for moving said pin, said slot having a portion that is narrow enough to hug the lock pin tightly and a wide portion, whereby when the lock pin is in said narrow portion the link is held against movement, and when it is in said wide portion the link is free to rock.

27. In a roll gauging machine, a frame, a hollow plunger having a portion adapted to engage a roll, said plunger being movable toward and away from a roll, resilient means tending to keep said plunger in engagement with a roll, a friction element in said plunger, a rod projecting from said friction element, a pin secured to a portion of the frame, a link having a slot in the end whereby it is pivotally supported on said pin, said rod having a member extending into said slot, whereby said link is rocked by the movement of said rod, an ejecting device and an electric circuit controlled by said link for operating said ejecting device.

28. In a roll gauging machine, a frame, a hollow plunger having a portion adapted to engage a roll, said plunger being movable endwise toward and away from said roll, resilient means tending to keep said plunger in engagement with said roll, a friction element in said plunger, a rod projecting from said friction element and terminating in a yoke whose arms are connected by a cross pin, a bracket secured to said frame, a pin secured to said bracket, a link having a slot in which said last mentioned pin and the cross pin of said rod are disposed, whereby said link is swung about said pin by the movement of said plunger and friction element, said link having a slot in its lower end, a rock shaft and a lock pin supported by said rock shaft and projecting into said slot in the lower end of said link said slot having a narrow portion in which the pin fits tightly and a wide portion, whereby the link rod and friction element are held against movement when the lock pin is in the narrow part of the slot of the link and are permitted to move when the lock pin is in the wide part of said slot.

29. In a roll gauging machine, a frame, a hollow plunger having a portion adapted to engage a roll, said plunger being movable endwise toward and away from said roll resilient means tending to keep said plunger in engagement with said roll, a friction element in said plunger, a rod projecting from said friction element and terminating in a yoke whose arms are connected by a cross pin, a bracket secured to said frame, a pin secured to said bracket, a link having a slot in which said last mentioned pin and the cross pin of said rod are disposed, whereby said link is swung about said pin by the movement of said plunger and friction element, said link having a slot in its lower end, a rock shaft, a lock pin supported by said rock shaft and projecting into said slot in the lower end of said link, said slot having a narrow portion in which the pin fits tightly and a wide portion, whereby the lock rod and friction element are held against movement when the lock pin is in the narrow part of the slot of the link and are permitted to move when the lock pin is in the wide part of said slot, an ejecting device and an electric circuit controlled by said link for operating said ejecting device.

30. A device for gauging rolls for roundness comprising a carrier adapted to contain a roll to be gauged, means for preventing rolls from dropping out of carrier, means for rotating a roll in said carrier, a plunger adapted to engage a roll in said carrier, said plunger being movable transversely of the carrier whereby said plunger is caused to move endwise by a roll that is out of round.

31. A device for gauging rolls for roundness comprising a carrier adapted to contain a roll to be gauged, means for rotating a roll in said carrier a hollow plunger adapted to be engaged by a roll in said carrier, said plunger being movable transversely of the carrier, a member in said plunger and having frictional engagement therewith, and means for holding said member against movement and for permitting movement thereof, whereby when a roll engages said plunger, said plunger moves in said frictional member to accommodate itself to the roll and then said plunger and frictional member move endwise as a unit if the roll is out of round.

32. A device for gauging rolls for roundness comprising a rotary disk provided with radially extending pockets each adapted to contain a roll to be gauged, means for preventing a roll from dropping out of said pockets, a rotary disk disposed adjacent to said positioning disk and rotating at a higher speed, said rolling disk having a portion adapted to contact with a roll in said positioning disk, an arcuate shoe adapted to be engaged by a roll in said positioning disk, a plunger on which said shoe is mounted, said plunger being movable transversely of the plane of the positioning disk, whereby said plunger is caused to move endwise by a roll that is out of round.

33. A machine for gauging rolls comprising a carrier adapted to receive rolls to be gauged, a taper gauging device, a roundness gauging device, said gauging devices being located in the path of travel of a roll in said carrier, means for moving said carrier to carry a roll past said taper gauging device and then past said roundness gauging device, a second carrier adapted to receive rolls from said first carrier, an ejecting device for causing defective rolls to drop into a chute, said ejecting device being actuated by said gauging devices, a gate actuated by said gauging devices, whereby a roll is sent in one direction or the other depending upon whether it is off taper or out of round and means for ejecting perfect rolls from the carrier after it has passed the point for ejecting defective rolls.

34. A machine for gauging rolls comprising a positioning disk provided with spaced pockets adapted to receive rolls to be gauged, a taper gauging device, a roundness gauging device, said gauging devices being located adjacent to the face of said positioning disk and in the path of travel of a roll in a pocket thereof, means for rotating said positioning disk to carry a roll past said taper gauging device and then past said roundness gauging device, a distributing disk provided with pawls that are adapted to receive rolls from said positioning disk, means for rotating said distributing disk, a tripping device for tripping said pawls to permit defective rolls to drop into a chute, said tripping device being set by said gauging devices to eject the rolls when they reach said distributing disk, a gate actuated by said gauging devices, whereby a roll is sent in one direction or the other depending upon whether it is off taper or out of round and means for tripping each of said pawls after is has passed the tripping device for defective rolls, to permit a perfect roll to drop therefrom.

35. A machine for gauging rolls comprising a positioning disk provided with spaced pockets adapted to receive rolls to be gauged, a taper gauging device, a roundness gauging device, said gauging devices being located adjacent to the face of said positioning disk and in the path of travel of a roll in a pocket thereof, means for rotating said positioning disk to carry a roll past said taper gauging device and then past said roundness gauging device, a distributing disk provided with pawls that are adapted to receive rolls from said positioning disk, means for rotating said distributing disk, a tripping device for tripping said pawls to permit defective rolls to drop into a chute, said tripping device being actuated by said gauging devices, a gate actuated by said gauging devices, whereby a roll is sent in one direction or the other depending upon whether it is off taper or out of round and means for securing said gate in off taper position when actuated by an off taper roll to prevent the roundness gauging devices from actuating said gate if the roll is also out of round, whereby a roll that is both off taper and out of round will be ejected with off taper rolls.

36. A machine for gauging rolls comprising a positioning disk provided with spaced pockets adapted to receive rolls to be gauged, a taper gauging device, a roundness gauging device, said gauging devices being located adjacent to the face of said positioning disk and in the path of travel of a roll in a pocket thereof, means for rotating said positioning disk to carry a roll past said taper gauging device and then past said roundness gauging device, a distributing disk provided with pawls that are adapted to receive rolls from said positioning disk, means for rotating said distributing disk, a tripping device for tripping said pawls to permit defective rolls to drop into a chute, said tripping device being actuated by said gauging devices, a gate actuated by said gauging devices, whereby a roll is sent in one direction or the other depending upon whether it is off taper or out of round and means for securing said gate in off-taper position when actuated by an off-taper roll to prevent the roundness gauging devices from actuating said gate if the roll is also out of round, whereby a roll that is both off taper and out of round will be ejected with off taper rolls, and means for tripping each of said pawls after it has passed the tripping device for defective rolls, to permit a perfect roll to drop therefrom.

37. A machine for gauging rolls comprising a taper gauging device, a roundness gauging device adapted to accommodate itself to rolls of different sizes means for carrying rolls past said gauging devices, an ejecting device, an electro-magnet for actuating said ejecting device; an electric circuit including said electro-magnet, the taper gauging device, a second electro-magnet and an automatic switch; said electric circuit being normally open at said automatic switch and at the taper gauging device, means for closing said electric circuit at the automatic switch when a roll is in engagement with the taper gauging device, the electric circuit being closed at said taper gauging device by a roll that is off-taper; a second electric circuit including said first mentioned ejector magnet, the roundness gauging device, a third electro-magnet and an automatic switch said circuit being normally open at said automatic switch and at the roundness gauging device, means for closing said circuit at said last mentioned automatic switch when a roll is in engagement with the roundness gauging device, means actuated by an out of round roll for closing the circuit at said roundness gauging device, means for preventing movement of said circuit closing means until the roundness gauging device has accommodated itself to the roll, and a sorting gate controlled by said electro-magnet of the taper and roundness gauging circuits for properly distributing rolls that are delivered thereto by means of the ejecting mechanism.

38. A machine for gauging rolls comprising a taper gauging device, a roundness gauging device, means for carrying rolls past said gauging devices an ejecting device, an electro-magnet for actuating said ejecting device; and electric circuit including said electro-magnet, the taper gauging device, a second electro-magnet and an automatic switch; said electric circuit being normally open at said automatic switch and at the taper gauging device means for closing said electric circuit at the automatic switch when a roll is in engagement with the taper gauging device, the electric circuit being closed at said taper gauging device by a roll that is off-taper; a second electric circuit including said first mentioned ejector magnet, the roundness gauging device a third electro-magnet and an automatic switch; said circuit being normally open at said automatic switch and at the roundness gauging device, means for closing said circuit at said automatic switch when a roll is in engagement with the roundness gauging device, the circuit being also closed at said roundness gauging device by a roll that is out of round, and a sorting gate controlled by said electro-magnets of the taper and roundness gauging circuits for properly distributing rolls that are delivered thereto by means of the ejecting mechanism.

39. A machine for gauging rolls comprising a taper gauging device, a roundness gauging device, means for carrying rolls past said gauging devices, a carrier provided with pawls for receiving gauged rolls, a bell crank lever, a bell crank lever secured thereto and adapted to trip a pawl to eject a roll thereon, swinging said bell crank lever into position for the trip lever to be attracted by said electro-magnet and set in tripping position when a roll is in contact with one of said gauging devices; an electro-magnet means for an electric circuit including said electro-magnet, the taper gauging device, a second electro-magnet and an automatic switch; said electric circuit being normally open at said automatic switch and at the taper gauging device, means for closing said electric circuit at the automatic switch when a roll is in engagement with the taper gauging device, the electric circuit being closed at said taper gauging device by a roll that is off-taper, a second electric circuit including said first mentioned ejector magnet, the roundness gauging device a third electro-magnet and an automatic switch; said circuit being normally open at said automatic switch and at the roundness gauging device, means for closing said circuit at said automatic switch when a roll is in engagement with the roundness gauging device, the circuit being also closed at said roundness gauging device by a roll that is out-of-round, and a sorting gate controlled by said electro-magnets of the taper and roundness gauging circuits for properly distributing rolls that are delivered thereto by means of the ejecting mechanism.

40. A machine for gauging rolls comprising a taper gauging device, a roundness gauging device, means for carrying rolls past said gauging devices, an ejecting device, an electro-magnet for actuating said ejecting device; an electric circuit including said electro-magnet, the taper gauging device, a second electro-magnet and an automatic switch; said electric circuit being normally open at said automatic switch and at the taper gauging device means for closing said electric circuit at the automatic switch when a roll is in engagement with the taper gauging device, said electric circuit being closed at said taper gauging device by a roll that is off-taper; a second electric circuit including said first mentioned ejector magnet, the roundness gauging device, a third electro-magnet and an automatic switch; said circuit being normally open at said automatic switch and at the roundness gauging device: means adapted to close said circuit at said automatic switch when a roll is in engagement with the roundness gauging device, the circuit being closed at said roundness gauging device by a roll that is out of round, sorting gate controlled by said electro-magnets of the taper and roundness gauging systems for properly distributing rolls that are delivered thereto by means of the ejecting mechanism and means actuated by an off taper roll for preventing the closing of the roundness gauging circuit at its automatic switch when said roll engages the roundness gauging device whereby an off-taper roll is prevented from closing the roundness gauging electric circuit.

41. A machine for gauging rolls comprising a taper gauging device, a roundness gauging device, means for carrying rolls past said gauging devices, an ejecting device, an electro-magnet for actuating said ejecting device; an electric circuit including said electro-magnet, the taper gauging device, a second electro-magnet and an automatic switch; said electric circuit being normally open at said automatic switch and at the taper gauging device, means for closing said electric circuit at the automatic switch when a roll is in engagement with the taper gauging device, the electric circuit being closed at said taper gauging device, the electric circuit being closed at said taper gauging device by a roll that is off-taper; a second electric circuit including said first mentioned ejector magnet, the roundness gauging device, a third electro-magnet and an automatic switch; said circuit being normally open at said automatic switch and at the roundness gauging device, means adapted to close said circuit at said automatic switch when a roll is in engagement with the roundness gauging device, the circuit being closed at said roundness gauging device by a roll that is out of round, sorting gate controlled by said electro-magnets of the taper and roundness gauging systems for properly distributing rolls that are delivered thereto by means of the ejecting mechanism, means actuated by an off taper roll for preventing the closing of the roundness gauging circuit at its automatic switch when said roll engages the roundness gauging device whereby an off-taper roll is prevented from closing the roundness gauging electric circuit; and means for ejecting perfect rolls from the machine.

42. In a machine of the kind described, a plurality of gauging devices, a rotary disk, said disk having pawls pivotally secured thereto and each adapted to receive a roll after it has passed the gauging devices, means actuated by the gauging devices for tripping said pawl if the roll thereon is defective, to permit said roll to drop into a chute, a swinging gate disposed in said chute, said gate being actuated by said gauging devices and constituting means for delivering a roll into one of two receptacles, and means for tripping the pawl after it has passed the point where defective rolls are ejected to permit a perfect roll thereon to drop therefrom.

43. In a gauging machine a rotary carrier adapted to receive gauged rolls, said carrier having a fixed jaw and a movable jaw between which a roll is held and a guideway comprising spaced walls of arcuate shape extending along the path of a roll in said carrier to support the roll on two sides.

44. A gauging machine for gauging rolls comprising a plurality of gauging devices and means for sorting gauged rolls, said means comprising a roll carrier provided with a plurality of recesses, a pin at one end of each of said recesses constituting a fixed jaw for supporting a roll, a pawl disposed in each of said recesses and pivotally secured to said carrier, a spring secured to each pawl to hold said pawl adjacent to said pin, said pawl having a seat for a roll, a hinged jaw for each pawl, each jaw being provided with a pin that contacts with a roll on said pawl, a spring for holding each jaw in engagement with its pawl, each pawl having a lug thereon, and a trip lever actuated by defective rolls to engage the lug of a pawl to swing said pawl to permit a roll to drop therefrom.

45. A gauging machine for gauging rolls comprising a plurality of gauging devices and means for sorting gauged rolls, said means comprising a roll carrier provided with a plurality of recesses, a pin at one end of each of said recesses constituting a fixed jaw for supporting a roll, a pawl disposed in each of said recesses and pivotally secured to said carrier, a spring secured to each pawl to hold said pawl adjacent to said pin, said pawl having a seat for a roll, a hinged jaw for each pawl, each jaw being provided with a pin that contacts with a roll on said pawl, a spring for holding each jaw in engagement with its pawl, each pawl having a lug thereon, and a trip lever actuated by defective rolls to engage the lug of a pawl to swing said pawl to permit a roll to drop therefrom, and means for resetting said trip lever into nontripping position.

46. A gauging machine for gauging rolls comprising a plurality of gauging devices and means for sorting gauged rolls, said means comprising a roll carrier provided with a plurality of recesses, a pin at one end of each of said recesses constituting a fixed jaw for supporting a roll, a pawl disposed in each of said recesses and pivotally secured to said carrier, a spring secured to each pawl to hold said pawl adjacent to said pin, said pawl having a seat for a roll, a hinged jaw for each pawl, each jaw being provided with a pin that contacts with a roll on said pawl, a spring for holding each jaw in engagement with its pawl, each pawl having a lug thereon, and a trip lever actuated by defective rolls to engage the lug of a pawl to swing said pawl to permit a roll to drop therefrom, and a sorting gate controlled by said gauging device for sorting defective rolls.

47. A gauging machine for gauging rolls comprising a plurality of gauging devices and means for sorting gauged rolls, said means comprising a roll carrier provided with a plurality of recesses, a pin at one end of each of said recesses constituting a fixed jaw for supporting a roll, a pawl disposed in each of said recesses and pivotally secured to said carrier, a spring secured to each pawl to hold said pawl adjacent to said pin, said pawl having a seat for a roll, a hinged jaw for each pawl, each jaw being provided with a pin that contacts with a roll on said pawl, a spring for holding each jaw in engagement with its pawl, each pawl having a lug thereon, and a trip lever actuated by defective rolls to engage the lug of a pawl to swing said pawl to permit a roll to drop therefrom, said pawls being each provided with a toe portion and a cam for engaging the toe portion of a pawl after it has passed the point of ejecting defective rolls to swing the pawl to permit a perfect roll to drop therefrom.

48. In a gauging machine gauging devices, a carrier having a plurality of pawls for receiving gauged rolls for sorting, and means for tripping said pawls to eject defective rolls, said means comprising an electric circuit adapted to be closed by a defective roll in a gauging device, an electro-magnet in said circuit, a bell crank lever, a bell crank lever for tripping said pawls, said trip lever being pivotally secured to said first mentioned bell crank lever and having frictional engagement therewith, and means for swinging said first bell crank lever when a roll is in contact with a gauging device, so that one arm of the trip lever is in position to be attracted by the energized electro-magnet, whereby the end of the trip lever is set in tripping position.

49. In a gauging machine gauging devices, a carrier having a plurality of pawls for receiving gauged rolls for sorting, and means for tripping said pawls to eject defective rolls, said means comprising an electric circuit adapted to be closed by a defective roll in a gauging device, an electro-magnet in said circuit, a bell crank lever, a bell crank lever for tripping said pawls, said trip lever being pivotally secured to said first mentioned bell crank lever and having frictional engagement therewith and means for swinging said first bell crank lever when a roll is in contact with a gauging device, so that one arm of the trip lever is in position to be attracted by the energized electromagnet, whereby the end of the trip lever is set in tripping position, means for returning the first bell crank lever to normal position after a roll has been ejected and means for returning the trip lever to normal position.

50. A gauging machine comprising a vertically disposed roll carrier adapted to receive rolls to be gauged, gauging devices disposed adjacent to said carrier in position to be engaged by a roll therein, a horizontally disposed roll carrier having a portion extending under said vertically disposed carrier to receive a roll therefrom and means for sorting rolls of correct taper and roundness from the others.

51. A machine of the kind described comprising a carrier for receiving rolls to be gauged, a taper gauging device disposed adjacent to said carrier in position to be engaged by a roll therein, a roundness gauging device disposed adjacent to said carrier in position to be engaged by a roll after it has passed the taper gauging device, a second carrier adapted to receive a roll from said first carrier after it has passed the gauging devices, and means controlled by said gauging devices for ejecting rolls from said second carrier.

52. A machine of the kind described comprising a carrier for receiving rolls to be gauged, means for rotating rolls in said carrier, a taper gauging device disposed adjacent to said carrier in position to be engaged by a roll therein, a roundness gauging device disposed adjacent to said carrier in position to be engaged by a roll after it has passed the taper gauging device, a second carrier adapted to receive a roll from said first carrier after it has passed the gauging devices, and means controlled by said gauging devices for ejecting rolls from said second carrier.

53. A device for gauging rolls for roundness, comprising a rotary carrier adapted to contain a roll to be gauged, a rotary disk adjacent to said rotary carrier and rotating at a different speed, said rotary disk having a portion adapted to contact with a roll in said carrier to rotate said roll and a plunger adapted to be engaged by a roll in said carrier, said plunger being movable transversely of the carrier, whereby said plunger is caused to move endwise by a roll that is out of round.

54. A device for gauging rolls for roundness, comprising a carrier adapted to contain a roll to be gauged, means for rotating a roll in said carrier, an arcuate shoe adapted to be engaged by a roll in said carrier, a hollow plunger on which said shoe is mounted said plunger being movable transversely of the carrier, a member in said plunger and having frictional engagement therewith, and means for holding said member against movement and for permitting movement thereof, whereby when a roll engages said plunger, said plunger moves in said frictional member to accommodate itself to the roll and then said plunger and said frictional member move endwise as a unit if the roll is out of round.

55. In a gauging machine, a carrier adapted to receive gauged rolls, said carrier having a fixed jaw and a movable jaw between which a roll is held and a guideway comprising spaced walls extending along the path of a roll in said carrier to support the roll on two sides.

Signed at Canton, Ohio, this 7th day of August, 1923.

JEREMIAH KELLER.